March 19, 1963 R. D. TOUTON Re. 25,355
CIGAR
Original Filed April 25, 1960
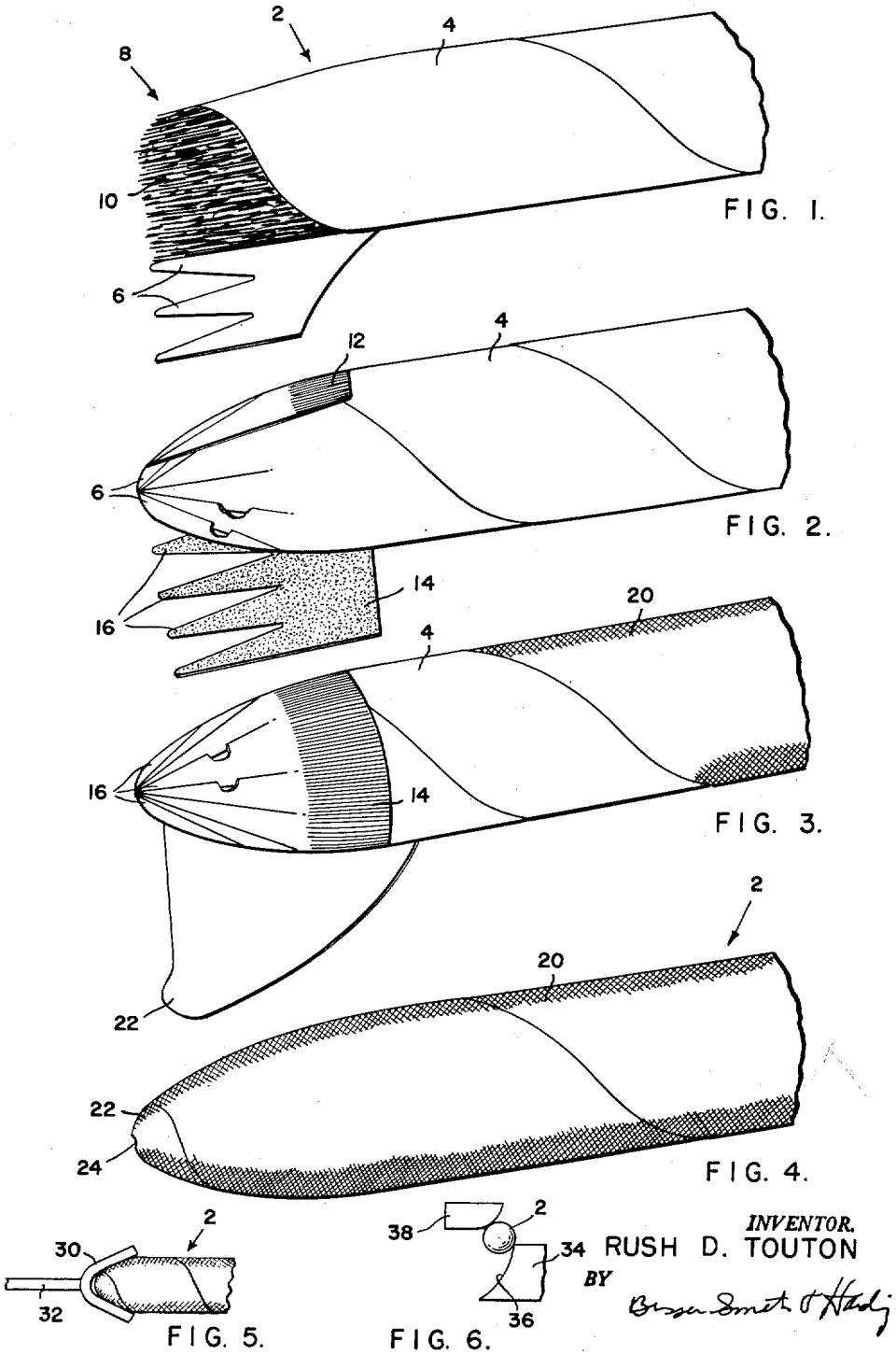
INVENTOR.
RUSH D. TOUTON
BY
Brown Smith & Hadley
ATTORNEYS United States Patent Office Re. 25,355
Reissued Mar. 19, 1963

25,355
CIGAR

Rush D. Touton, Wynnewood, Pa., assignor to Wurton Machine Company, Philadelphia, Pa., a corporation of Pennsylvania Original No. 3,016,903, dated Jan. 16, 1962, Ser. No. 24,427, Apr. 25, 1960. Application for reissue Mar. 16, 1962, Ser. No. 180,949
5 Claims. (Cl. 131—11)

Matter enclosed in heavy brackets [ ] appears in the original patent but forms no part of this reissue specification; matter printed in italics indicates the additions made by reissue.

This invention relates to a cigar having a cone shaped head, prepared for insertion in the smoker's mouth. Such cigars are composed of an interior filler, comprising the major portion of the product, and which is normally prepared of a number of pieces of tobacco, some of which may be relatively small. This filler will be encased in a spirally rolled binder, which may be of natural tobacco leaf or of a sheet formulated from tobacco materials. This binder may be supplemented by a reinforcing strip wound into the assembly at the head end, to provide greater moisture resistance and assurance of retention of the shape. The final component of this cigar is the external wrapper which has many characteristics of appearance, in addition to its requirement as a compressing envelope to hold the entire cigar and, especially, the cone shaped head end.

In the present procedure of cigar manufacture, the binder is rolled on the cigar in a straight tube form, and a mechanical shaper squeezes the binder and/or the reinforcing strip into the cone form prior to application of the final wrapper. This abrupt shaping of the head causes serious bulging and irregular creasing as the materials are forced inwardly into the reduced diameter at the head. The delicate wrapper tobacco is then required to assume the burden of holding the deformed end of the tube in its final form.

There is a strong tendency for the comparatively inflexible and imperfectly folded portions to straighten out, thus opening the wrapper at the cone shaped end of the cigar so that particles of filler are then free to be drawn into the smoker's mouth. This opening action is accentuated by the indentations made in the cigar during smoking, and is accelerated by the external and internal moisture added to the head end during the smoking operation.

In accordance with this invention, means are provided to accommodate the binder and/or reinforcing strip into an overlapping pattern without deformation during the squeezing operation, thus creating an internally smooth shape, and reinforcement due to the lamination sections incident to the overlapping pattern.

The invention will be further clarified on reading the following description in conjunction with the drawing in which:

FIGURE 1 is a perspective view of a cigar in accordance with this invention showing the structure of the binder sheet;

FIGURE 2 is a perspective view of a cigar in accordance with this invention showing the binder sheet in position showing the construction of the reinforcing strip;

FIGURE 3 is a perspective view of the cigar of FIGURE 2 showing the reinforcing strip in final position and the wrapper partially placed on the cigar;

FIGURE 4 shows the completed cigar;

FIGURE 5 illustrates schematically one method of reducing the diameter of the head of the cigar; and FIGURE 6 shows schematically an alternative method of reducing the diameter of the head of a cigar.

As shown in the figures, a cigar 2 in accordance with this invention is provided with a spirally wrapped binder sheet 4. The edge of binder sheet 4 adjacent the head 8 of cigar 2 is provided with scallops 6. Tobacco filler 10 is contained within binder sheet 4. As seen in FIGURE 2, when the tip end of wrapper sheet 4 is wrapped about the head 8 and the head is reduced in diameter by means conventionally employed for this purpose, scallops 6 will overlap to accommodate for the reduced diameter and thereby eliminate folds in the reduced head end of binder sheet 4 and provide greater strength due to the multiple thickness provided. Binder sheet 4 will be made of any of the materials conventionally employed for this purpose, such as for example, binder leaf tobacco or "formulated" tobacco sheet material preferably composed of tobacco or tobacco byproducts.

As best seen in FIGURES 2 and 3, a reinforcing strip 12 may be wrapped around the head end of binder sheet 4 and adhered thereto by an adhesive indicated at 14. Strip 14 is provided with scallops 16 along its head edge. Before adhesive 14 sets, the cigar is again placed in the apparatus employed for reducing the diameter of the head end which conforms strip 12 to the remainder of head 8 and causes scallops 16 to come together and overlap in a laminated manner to accommodate for the reduced diameter without the production of objectionable folds and to increase structural strength of the head by reason of the multiple thickness provided by the overlapping scallops. If desired, the first reducing step after positioning the binder can be eliminated and only one reducing step employed after the reinforcing strip is positioned. The adhesive, if applied in excess, will filter inwardly and provide better stability by binding together particles of filler tobacco and preventing their entry into the smoker's mouth.

The reinforcing strip will be made of a moisture resistant, nontoxic, substantially odorless and tasteless material, for example a natural or synthetic resin desirably containing a substantial amount of comminuted tobacco. Suitable materials are, for example, regenerated cellulose polyvinyl acetate, polyethylene, polytetraethylene (Teflon) and nylon. Similarly the adhesive will be a damp proof, nontoxic, substantially odorless and tasteless material, such as for example, gum tragacanth or nylon, both of which materials are readily applied when liquified in ethyl alcohol and water. When the reinforcing strip is a thermoplastic material, it may be heat sealed to the binder.

A wrapper 20 is then spirally wound on to the cigar, the wrapper 20 being provided with a conventional flag end 22 to form a smooth tight wrapping about the reduced diameter tip 8. To complete the cigar, a hole 24 can be retained or placed in the head end of the cigar.

Since apparatus for reducing the diameter of the head of a cigar is well-known, it is believed that this operation as referred to above need not be set forth in detail. A typical structure for reducing the diameter of a cigar head is illustrated in FIGURE 5 where there is shown a paraboloid-shaped cup 30 mounted on a shaft adapted to be rotated. While the cup is rotating, the cigar 2 in a partial state of completion as discussed above is introduced into the interior of the cup and forced toward the bottom of the cup to produce the desired reduced diameter. Another typical apparatus is schematically illustrated in FIGURE 6 where there is shown a die member 34 provided with an arcuate face 36 and a moving die member 38 adapted to roll the head end of a cigar 2 against surface 36 and thus reduce the diameter of the head.

It will be appreciated that the foregoing structure can omit the employment of the reinforcing strip and that when the reinforcing strip is employed it may be desirable to have either one or both of the binder and the reinforcing strip scalloped as described above.

It is not desired to be limited except as set forth in the following claims.

What is claimed is:

1. A cigar comprising a binder sheet having a scalloped edge adjacent the head end of the cigar, a tobacco filler contained within said binder sheet, and a wrapper overlying said sheet [and said strip], the head of said cigar being of reduced diameter and said scallops being overlapped.

2. A cigar comprising a binder sheet, a tobacco filler contained within said binder sheet, a reinforcing strip secured to the head end of said cigar and having scallops on the edge extending peripherally about the head end of the cigar, and a wrapper overlying said sheet and said strip, the head of said cigar being of reduced diameter.

3. A cigar comprising a binder sheet, a tobacco filler contained within said binder sheet, a reinforcing strip secured to the head end of said cigar and having scallops on the edge extending peripherally about the head end of the cigar, and a wrapper overlying said sheet and said strip, the head of said cigar being of reduced diameter and said scallops being overlapped.

4. A cigar comprising a binder sheet having a scalloped edge adjacent the head end of the cigar, a tobacco filler contained within said binder sheet, a reinforcing strip secured to the head end of said cigar and having scallops on the edge extending peripherally about the head end of the cigar, and a wrapper overlying said sheet and said strip, the head of said cigar being of reduced diameter.

5. A cigar comprising a binder sheet having a scalloped edge adjacent the head end of the cigar, a tobacco filler contained within said binder sheet, a reinforcing strip secured to the head end of said cigar and having scallops on the edge extending peripherally about the head end of the cigar, and a wrapper overlying said sheet and said strip, the head of said cigar being of reduced diameter and said scallops being overlapped.

References Cited in the file of this patent or the original patent

UNITED STATES PATENTS

| | | |
|---|---|---|
| 1,916,799 | Hughes | July 4, 1933 |
| 1,995,069 | Lim | Mar. 19, 1935 |